Jan. 6, 1970   M. BEKEDAM   3,487,611
SPRAY-FLOW DEAERATOR
Filed Jan. 29, 1968   2 Sheets-Sheet 1
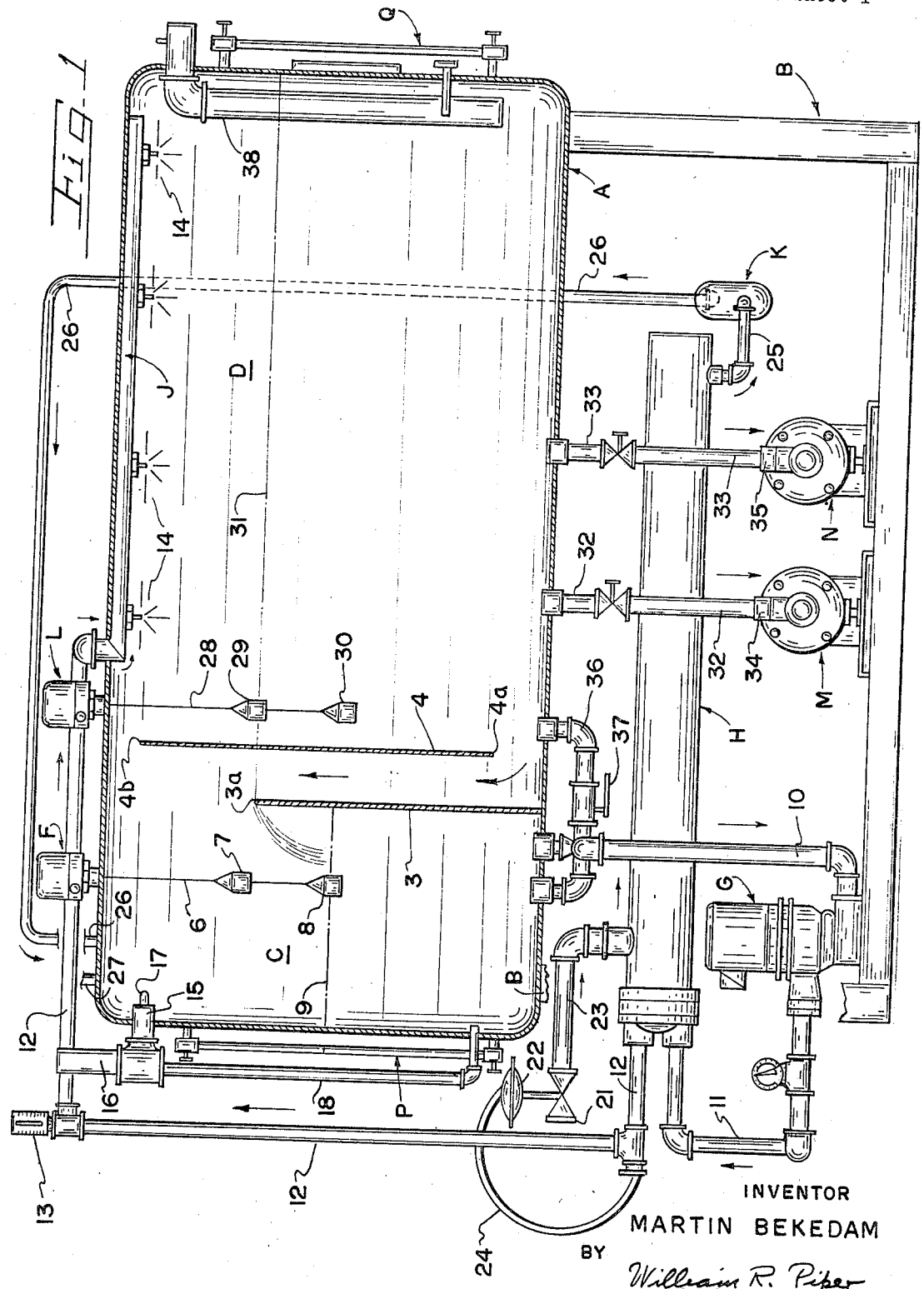
INVENTOR
MARTIN BEKEDAM
BY
William R. Piper
ATTORNEY Jan. 6, 1970 M. BEKEDAM 3,487,611
SPRAY-FLOW DEAERATOR
Filed Jan. 29, 1968 2 Sheets-Sheet 2
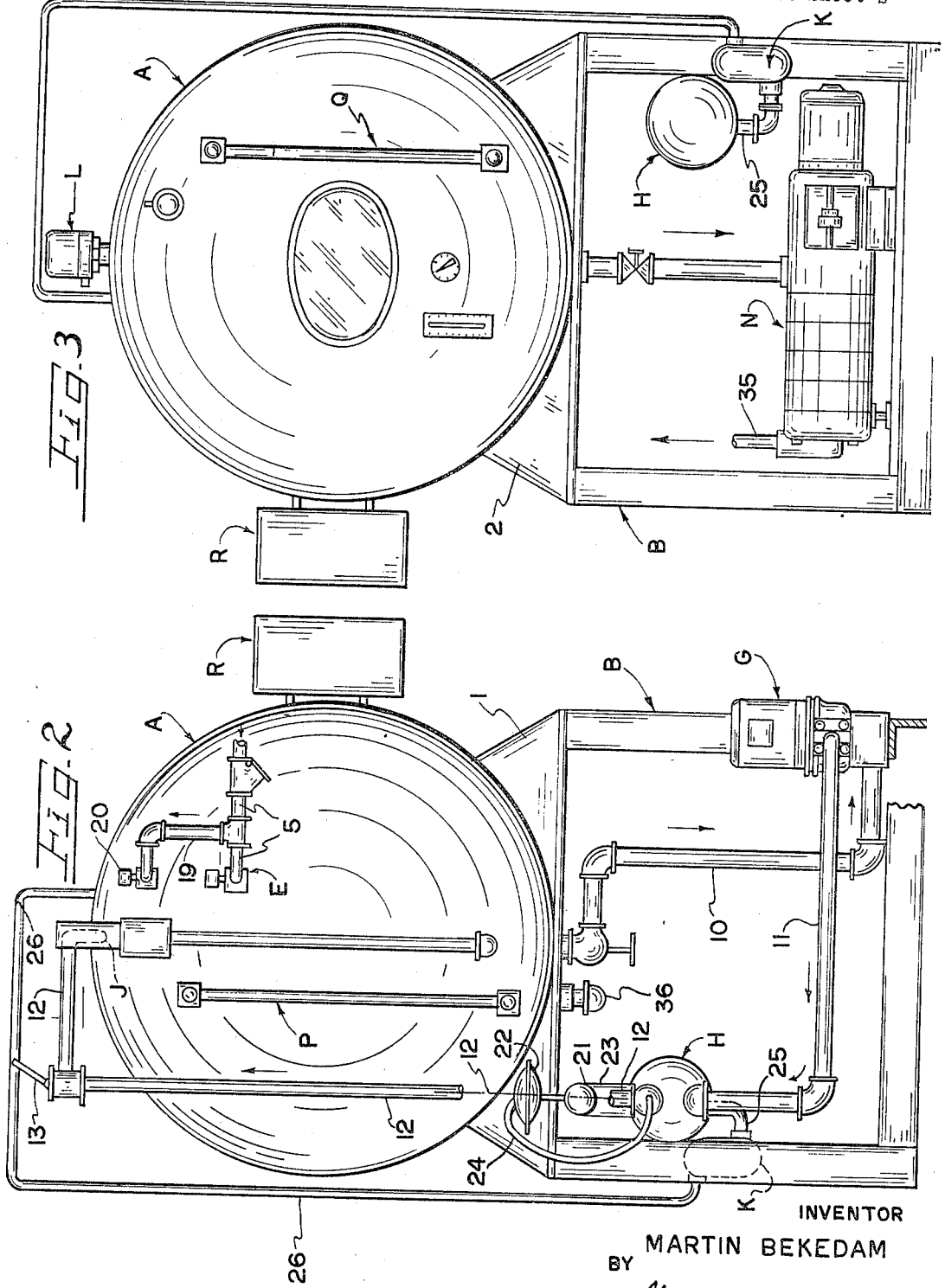
INVENTOR
MARTIN BEKEDAM
BY William R. Piper
ATTORNEY United States Patent Office 3,487,611
Patented Jan. 6, 1970

3,487,611
SPRAY-FLOW DEAERATOR
Martin Bekedam, 1231 16th Ave., Orinda, Calif. 94610
Filed Jan. 29, 1968, Ser. No. 701,325
Int. Cl. B01d 19/00
U.S. Cl. 55—166    3 Claims

ABSTRACT OF THE DISCLOSURE

An atmospheric deaerator that has a water mixing section and a hot water deaerating section. The mixing section receives condensate and raw cold water as well as a continuous flow of hot water in the form of a thin sheet of water from the deaerating section. This heated water will blend with the water in the mixing section and will raise the temperature of the water therein. The water is continually withdrawn from the mixing section and is passed through a heat exchanger for raising the temperature to 220° F. This heated water is then sprayed into the top of the deaerating section under pressure for the purpose of "scrubbing" gases therefrom. The deaerated hot water is received in the deaerating section and can be pumped from this section and delivered to a boiler as needed.

BACKGROUND OF THE INVENTION

Field of the invention

It has always been difficult to control the temperature in the deaerating of water when using a temperature controller. This is due to the transmission lag because of the type of equipment being used. Most manufacturers try to overcome this lag by pressurizing the deaerator from three to fifteen pounds. They can then use a pressure controller to control the temperature of the water. For example 5 pounds p.s.i.g.=228° F. If this type of pressurized deaerator receives a sudden quantity of cold water due to boiler demand, it is possible to have pressure decay within the deaerator, causing all the water within it to boil. This will cause the boiler feed pumps to flash and stop from pumping.

Description of the prior art

The patent to C. I. Baker, No. 2,997,129, is for deaeration in a steam heating system and makes use of a deaerating vacuum receiver. There is no disclosure of a water mixing section cooperating with the deaerator so as to have a continuous flow of water from the mixing section to the deaerator and then back to the mixing section for removing gases from the water and for heating the raw water entering the mixing section.

The patent to C. Strohmeyer, Jr., No. 3,162,179, is for a fluid circulation system for a once-through type steam generator. Here again no water mixing section is shown for receiving heated and deaerated water from the deaerator and no pump is used for removing water continuously from the mixing section and spraying it into the deaerator for removing gases therefrom.

The patent to T. S. Sprague, No. 3,215,216, is for a once-through vapor generator. No water mixing section is disclosed in this patent for delivering water to the deaerator.

SUMMARY OF THE INVENTION

An object of my invention is to provide a device which has a water mixing section for receiving new cold make-up water or condensate return water as well as hot deaerated water from a deaerating section and the mixing of the water raises the temperature of the make-up water before it is delivered to the deaerating section. A heat exchanger can be interposed between the water mixing section and the deaerator section for raising the temperature of the water still further before it enters the deaerator section.

A further object of my invention is to provide a device in which there is a continuous flow of a thin sheet of deaerated water from the deaerating section into the water mixing section for the purpose of blending with the water in the mixing section and providing a more uniform temperature that will gradually change and give the temperature controller for the water a sufficient time to act. Furthermore, water is continuously removed from the water mixing section and is sprayed into the top of the deaerating section for "scrubbing" the water and removing gases therefrom. This continuous circulation of water from the mixing section to the deaerating section and back to the mixing section is greater is quantity than the amount of water withdrawn from the deaerating section for the needs of the boiler. This will prevent the deaerating section from being drained of water and there will be a constant recycling of the water regardless of the load needed.

The spraying of the water from the mixing section into the deaerating sections is accomplished by forcing the water through the spray nozzles under a constant pressure for the removal of carbon dioxide and oxygen from the water. The spray nozzles are not spring loaded. My device provides a full or complete deaeration of the water from zero to a full load while using an atmosphere deaerator. The temperature control valve acts slowly and this will cause no trouble because the continuous circulation of the hot water from the deaerating section to the mixing section will cause a blending of the hot water with the cold raw water and prevent the cold water from creating a too sudden temperature change.

BRIEF DESCRIPTION OF THE DRAWINGS

FIGURE 1 is a longitudinal section through the spray-flow deaerator.

FIGURE 2 is an end view of the device when looking from the left hand end of FIGURE 1.

FIGURE 3 is an opposite end view of the device when looking from the right hand end of FIGURE 1.

DESCRIPTION OF THE PREFERRED EMBODIMENT

In carrying out my invention I provide a tank indicated generally at A, in FIGURES 1, 2 and 3, and the tank is supported by cradles 1 and 2 at each end, the cradles in turn being carried by a fabricated frame B. The tank is divided into two sections, a water mixing and tempering section C, and a deaerating section D, as shown in FIGURE 1. A pair of spaced apart and transversely extending baffles 3 and 4 divide the tank into the two sections. The transverse baffle 3 extends upwardly from the bottom of the tank and its upper horizontal edge 3a determines the level of the water in the deaerating section D. The other transverse baffle 4 is spaced from and parallels the baffle 3. The lower edge 4a of the baffle 4 is spaced above the tank bottom while the upper edge 4b extends above the upper edge 3a of the baffle 3, but is spaced below the top of the tank for a purpose hereinafter described. The two baffles 3 and 4 provide a vertical passageway therebetween for the water to leave the deaerating section D, and spill over the top of the partition 3 in the form of a thin sheet of water and enter the mixing section C.

In FIGURE 2, a water inlet pipe 5 communicates with the mixing section C of the tank A, and a solenoid valve E, controls the flow of raw cold water into the mixing section. FIGURE 1 shows a water level control switch casing indicated generally at F, and preferably of the type shown in my copending patent application on a reciprocating magnetic means for operating snap action mercury micro switches, Ser. No. 682,222, filed Nov. 13, 1967. A rod 6 depends from the switch casing and carries two liquid displacers 7 and 8 that are spaced the desired distance apart. When the water level 9 in the mixing section C, drops below a predetermined point, the lower displacer 8 will pull the rod 6 downwardly to close a switch, not shown, in the casing F which in turn will close an electric circuit to the solenoid valve E for opening the valve and permit raw or make-up water to enter the mixing section. As soon as the water level rises in the mixing section to the desired height, the displacer 8 will lift the rod 6 and open the switch to permit the solenoid valve E to close. The function of the upper liquid displacer 7 will be explained when setting forth the operation of the entire device.

Water is continuously withdrawn from the mixing section C and delivered to the deaerating section D for the purpose of removing carbon dioxide and oxygen therefrom. This is accomplished by a transfer pump G, see FIGURES 1 and 2, that draws water out from the bottom of the mixing section C, and through a pipe 10. Another pipe 11 leads from the transfer pump to a heat exchanger H of standard construction where the temperature of the water is raised to a predetermined point such as 220° F. From the heat exchanger another pipe 12 leads to a spray nozzle manifold J, that is disposed at the top of the deaerating section D, and above the water level therein. A thermometer 13 is connected to the pipe 12 and will indicate the temperature of the water flowing therein. Heating the water can also be accomplished by feeding steam directly into the deaerating section through a perforated pipe that is placed below the water line in the section.

The spray nozzle manifold J has a plurality of wide-angle, stainless steel spray nozzles 14 that are continuously pressurized by the hot water under pressure being delivered to them by the transfer pump G, see FIGURE 1. Thin films of water are formed by the spray nozzles and these must be created so that the dissolved gases in the water do not have to travel so far through the thin film to be released. The spray nozzles are under constant water pressure during all phases of the deaerating operation and under all load conditions. Complete agitation of the water is required to effectively "shake out" all of the dissolved gases. This is accomplished by forcing the water at a temperature above boiling and under a continuous pressure through the spray nozzles where the pressure is released and the gases are freed.

The dissolved gases that are released from the water as it issues from the spray nozzles 14, see FIGURE 1, flow across the top of the deaerating section D, and pass into the top of the mixing section C, where they will escape into an unrestricted vent condenser 15. A free vent 16 communicates with the vent condenser and provides a complete and an unrestricted removal of all dissolved gases. A vent condenser wide angle stainless steel spray nozzle 17 is placed at the entrance to the vent condenser 15 and operates continuously to reclaim all condensable vapors. All such condensed vapors woud be received in a pipe 18 and returned back to the mixing section at a point below the water level 9. The pipe 18 is termed an equalizing leg. The spray nozzle 17 receives its water supply through a pipe 19, see FIGURE 2, that communicates with the raw water supply pipe 5. A solenoid valve 20 for the pipe 19 is opened as soon as the transfer pump G starts operating and this assures a constant water spray from the nozzle 17 into the vent condenser 15 for completely reclaiming all of the condensable vapors.

Before completing the description of the constant recycling of the water from the mixing section C to the deaerating section D, and then back to the mixing section, it is best to state at this time that steam is delivered to the heat exchanger H through a steam inlet shown at 21 in FIGURE 1. A temperature controller 22 controls the flow of steam into a pipe 23 that in turn conveys the steam to the heat exchanger in the usual manner. A temperature bulb, not shown, is placed in the water conveying pipe 12 and a conduit 24 leads from the temperature bulb to the temperature controller 22. A pipe 25 leads from the heat exchanger to a steam trap K, and another pipe 26 leads from the steam trap to the mixing and water tempering section C of the tank A. The heat exchanger H, operates in the usual manner and sufficient steam is delivered to the heat exchanger through the pipe 23 to maintain the temperature of the water in the pipe 12 at about 220° F.

The deaerated water received in the deaerating section D of the tank A, from the wide angle spray nozzles 14, see FIGURE 1, does not remain in a stagnate condition. Instead this water is caused to flow continuously under the baffle 4 of the tank and up between the two baffles 3 and 4. The deaerated water will spill over the upper edge 3a of the baffle 3 in a thin film. The hot water from the deaerating section D will mix with the water in the mixing section C, and will raise the temperature of the water in the latter section. The raw cold water entering the mixing section C through the pipe 5 is heated in this manner. There is also a condensate inlet pipe 27 that is connected to the top of the mixing section C. This pipe acts as a return for the low pressure trapped and pumped returns. The mixing section therefore receives three types of water, namely: raw cold (make-up) water from the pipe 5, condensate and return water from the processing units, not shown, and deaerated water from the deaerating section D of the tank A.

The transfer pump G assures a constant recycling of the water from the mixing section C, to the deaerating section D, and back again so long as the device is in operation. The deaerating section D is equipped with a two level actuator indicated generally at L in FIGURE 1. A rod 28 extends downwardly from the two level actuator and carries two liquid displacers 29 and 30 that are spaced apart a predetermined distance. The upper liquid displacer 29 is placed on the rod 28 at a position where it will be acted upon when the water level 31 exceeds a predetermined point. The rod 28 will be lifted and will close a switch, not shown, to sound a high level alarm.

The lower liquid displacer 30 is for use when the boiler, not shown, is shut down or there is low steam consumption and the transfer pump G stops operating. In this case should the water level 31 in the deaerator D drop below a predetermined point, the liquid displacer 30 would actuate the rod 28 and close an electric switch, not shown, in the casing L, for starting the transfer pump G, and replenishing the deaerator section D with water.

Deaerated water is drawn from the deaerating section D, as required by the boiler, not shown. In FIGURES 1 and 3, I show two water outlet pipes 32 and 33 leading from the bottom of the deaerating section D, to two boiler feed pumps M and N, respectively. Pipes 34 and 35 lead from the discharge ends of the boiler feed pumps M and N, respectively, to the boiler, not shown.

As already stated, the transfer pump G operates continuously whenever the boiler is firing. There may be periods when the boiler is not firing, but requires water, and this will lower the water in the deaerating section D. The transfer pump G will be operated by the liquid displacer 30 acting on the rod 28 due to the lowering of the water level in the section D and closing the switch in the casing L. This enables the deaerating section to have an ample supply of hot deaerated water on hand during low or no load periods of the boiler.

In FIGURE 1, I show a by-pass pipe 36 leading from the bottom of the mixing section C to the bottom of the deaerating section D. A valve 37 in the pipe 36 can be opened when the operator wishes to permit make-up water in the mixing section C, to pass directly into the deaerating section D, without passing through the transfer pump G, in case of an emergency. A water gage P for the mixing section C is shown in FIGURES 1 and 2, and another water gage Q for the deaerating section D, is shown in FIGURES 1 and 3. A control panel, indicated generally at R, in FIGURES 2 and 3, may be used with the device.

OPERATION

From the foregoing description of the various parts of the device, the operation thereof may be readily understood. Raw cold make-up water is delivered to the mixing section C as needed and the lower liquid displacer 8 on the rod 6 controls the closing of the switch in the controller F to cause the solenoid valve E to open and permit feed water to enter through the pipe 5. The transfer pump G continuously removes water from the mixing section C and delivers it to the spray nozzles 14 where the gases are removed and the deaerated water drops into the deaerating section D. The water is heated by the heat exchanger H, before being sprayed from the nozzles 14. There will be a continuous overflow of hot water at 220° F. from the deaerating section D to the mixing section C in a thin film of water. The heated water entering the mixing section C will raise the temperature of the raw or feed water in this section. The released gases from the water will escape through the vent condenser 15. The spray nozzle 17 will aid in condensing any gases that can be condensed and the condensate will return to the mixing section C through the return pipe or leg 18. The noncondensable gases will exhaust to the atmosphere through the vent 16. The upper liquid displacer 7 controls the flow of new make-up water going to the spray nozzle 17 for the vent condenser 15. It does so by actuating the rod 6 which in turn actuates the switch in the controller F for opening the solenoid valve 20 for the pipe 19 and nozzle 17 when the water level 9 in the mixing section C is too low and for closing the solenoid valve when the water level is too high, as when the boiler, not shown, is shut down.

Deaerated water can be removed from the deaerating section D, and delivered to the boiler, not shown, by the boiler feed pumps M and N. The transfer pump G can deliver about 125% more water to the deaerating section D than can be removed by the boiler feed pumps and therefore it will be impossible to drain the deaerating section of all of its water. I have invented a new means for tempering new cold make-up water or cold condensate return water by using a water mixing section C before delivering the water to the heat exchanger H and the deaerating section D. The heat for the mixing section C comes from the heated deaerated water delivered from the deaerating section D. Approximately 20% of all of the water delivered to the deaerating section D, overflows back into the mixing section C. In this manner I obviate any sudden temperature change of the water in the mixing section. This will give the temperature controller time in which to respond to water temperature changes and keep the water temperature where it belongs for good deaeration under all load conditions. The spray nozzles 14 will be under constant water pressure from water being delivered by the continuously operating transfer pump G, for complete atomization of the water regardless of load conditions from 0 to 100%. The transfer pump G, can be operated by a timer, not shown, during no load periods in order to keep the temperature of the water in the deaerator at 212° F. at all times so as to be ready when the boiler needs more deaerated hot water. Also if 100% new cold water is used, a water heating coil, not shown, could be placed in the mixing section C to raise the water temperature therein and relieve some of the load that would otherwise be placed on the heat exchanger H. It should also be noted that in regard to the spray nozzles 14, the water sprayed therefrom has a direct contact condensing effect on the steam vapors arising from the heated water in the deaerating section D. The deaerating section may be provided with an overflow pipe shown at 38 in FIGURE 1.

The device removes oxygen and carbon dioxide from the water. When water is heated, the oxygen in it becomes extremely corrosive to processing equipment and condensate lines. Carbon dioxide is found in a "free" state in most raw waters and becomes very corrosive when combined with water to form carbonic acid. The combination of oxygen and carbon dioxide becomes four times as corrosive as when only one of them is present.

The raising of the temperature of feed water to the boiler is worthwhile because it reduces the changes of thermal shock caused by the expansion and contraction of heating surfaces. Large volumes of cold water will collapse steam bubbles causing an unstable water level and the fluctuation of firing rates. Boiler stability insures economic operation.

The venting of the dissolved gases is a most important phase of a good deaerating device. The venting is done effectively with atmospheric storage of the deaerated water. If a deaerator is operated under a predetermined pressure, the vent is fixed and the restriction is pre-set or manually adjusted. Since feedwater will vary in oxygen content and since load conditions vary and percentages of condensate vary, a fixed vent results in a fixed loss. Tightly restricted vents which save steam loss at low loads will not allow gases to leave the deaerator and be properly vented at higher loads. With atmospheric water storage, a free open vent assures a complete removal of all of the gases released from the water.

I claim:
1. In a spray flow deaerator:
  (a) a tank having a water mixing section and a deaerating section communcating with said water mixing section;
  (b) means for delivering raw water to said mixing section as needed to maintain a body of water at a predetermined level therein;
  (c) means for continuously removing water from said mixing section and heating it and then spraying it into said deaerating section under pressure for removing gases from the water;
  (d) means disposed between said mixing and deaerating sections for continuously removing water from the deaerating section and delivering it to the mixing section for aiding in blending and raising the temperature of the water in the mixing section; and
  (e) means for removing deaerated water from said deaerating section as needed for a boiler.

2. The combination as set forth in claim 1: and in which
  (a) said means that removes water from the body of water in said mixing section including a water heating means so that there will be a continuous heating of the removed water and a delivering of this heated water under pressure to the spraying means for continuously deaerating the heated water;
  (b) temperature responsive and level responsive control means constructed and located so as to maintain the continuous removal of water from said mixing section and returning it as heated water and deaerated water to the deaerating section, assuring a continuous flow of heated and deaerated water into said deaerating section for maintaining a body of water in the deaerating section at a high temperature regardless of how great or little the quantity of water being removed from the deaerating section for delivery to the boiler or if no water is being delivered to the boiler.

3. The combination as set forth in claim 1: and in which
  (a) the means disposed between said mixing and deaerating sections for delivering water from the latter to the former includes two partitions;
  (b) the first partition extending transversely across said tank and having its lower edge contacting the tank bottom and its upper edge being spaced from the tank top and constituting one of the walls of the mixing section;

(c) the second partition being within the deaerating section, spaced from the first partition and having its lower edge spaced above the tank bottom to form a flow passage so that the water flowing from the deaerating section to the mixing section will be taken from the lower and colder portion of the body of water in the deaerating section;

(d) insulating means comprising the water lying between the two partitions between the colder water in the mixing section and the hotter water in the deaerating section.

References Cited

UNITED STATES PATENTS

| | | | |
|---|---|---|---|
| 2,735,623 | 2/1956 | Baker | 55—195 X |
| 2,783,853 | 3/1957 | Schaub | 55—201 X |
| 2,792,904 | 5/1957 | Sebald | 55—193 |

REUBEN FRIEDMAN, Primary Examiner

R. W. BURKS, Assistant Examiner

U.S. Cl. X.R.

55—39, 42, 200, 201